US010055725B2

(12) United States Patent
Sprecher

(10) Patent No.: US 10,055,725 B2
(45) Date of Patent: Aug. 21, 2018

(54) SIMPLE IN-STORE PAYMENTS

(71) Applicant: GOOGLE LLC, Mountain View, CA (US)

(72) Inventor: Benjamin Sprecher, Waltham, MA (US)

(73) Assignee: GOOGLE LLC, Mountain View, CA (US)

( * ) Notice: Subject to any disclaimer, the term of this patent is extended or adjusted under 35 U.S.C. 154(b) by 655 days.

(21) Appl. No.: 14/458,445

(22) Filed: Aug. 13, 2014

(65) Prior Publication Data

US 2016/0048821 A1 Feb. 18, 2016

(51) Int. Cl.
*G06Q 20/22* (2012.01)
*G06Q 20/20* (2012.01)
*G06Q 20/40* (2012.01)
*G06Q 30/06* (2012.01)

(52) U.S. Cl.
CPC ............ *G06Q 20/22* (2013.01); *G06Q 20/20* (2013.01); *G06Q 20/40* (2013.01); *G06Q 30/06* (2013.01)

(58) Field of Classification Search
CPC ..................................... G06Q 20/22
USPC ......................................... 705/16
See application file for complete search history.

(56) References Cited

U.S. PATENT DOCUMENTS

| 8,285,588 | B2 * | 10/2012 | Postrel ................. | G06Q 20/105 705/14.1 |
| 8,640,950 | B2 | 2/2014 | Adams et al. | |
| 9,141,974 | B2 * | 9/2015 | Jones ................. | H04M 1/72569 |
| 2001/0034720 | A1 * | 10/2001 | Armes ................. | G06Q 10/04 705/65 |
| 2003/0028481 | A1 * | 2/2003 | Flitcroft ................. | G06Q 20/00 705/39 |
| 2005/0068190 | A1 * | 3/2005 | Krause ............... | G06K 17/0022 340/4.31 |

(Continued)

FOREIGN PATENT DOCUMENTS

| CA | 2790983 A1 | 3/2013 |
| WO | 2013187935 A1 | 12/2013 |
| WO | 2016/161106 A1 | 10/2016 |

OTHER PUBLICATIONS

International Preliminary Report on Patentability dated Feb. 23, 2017 as received in Application No. PCT /US2015/043719.

(Continued)

*Primary Examiner* — Oluseye Iwarere
(74) *Attorney, Agent, or Firm* — Johnson, Marcou & Isaacs, LLC

(57) ABSTRACT

Systems and techniques are provided for in-store payments. A customer identifier and a point-of-sale identifier may be received. A user payment account may be determined based on the customer identifier. The user payment account may be associated with a customer identified by the customer identifier. Transaction data may be received for a transaction for the customer created using the point-of-sale card at a point-of-sale computing device. The transaction data may include a purchase total. The transaction may be authorized. The point-of-sale card may not always be active. The point-of-sale card associated with the point-of-sale identifier may be activated after the user payment account based on the customer identifier is determined. The point-of-sale card may be deactivated after the transaction is authorized.

34 Claims, 6 Drawing Sheets

(56) References Cited

U.S. PATENT DOCUMENTS

| | | | |
|---|---|---|---|
| 2007/0073619 A1* | 3/2007 | Smith | G06Q 20/105 705/41 |
| 2009/0271265 A1* | 10/2009 | Lay | G06Q 20/0453 705/14.38 |
| 2011/0047036 A1 | 2/2011 | Foran-Owens et al. | |
| 2011/0153406 A1* | 6/2011 | Mackin | G06Q 30/02 705/14.35 |
| 2011/0208659 A1* | 8/2011 | Easterly | G06Q 20/027 705/79 |
| 2011/0258058 A1* | 10/2011 | Carroll | G06Q 30/06 705/15 |
| 2012/0030003 A1* | 2/2012 | Herwig | G06Q 20/0453 705/14.38 |
| 2012/0078751 A1* | 3/2012 | MacPhail | G06Q 20/06 705/26.41 |
| 2012/0166334 A1 | 6/2012 | Kimberg et al. | |
| 2012/0221422 A1* | 8/2012 | Sobek | G06Q 20/20 705/17 |
| 2012/0271712 A1* | 10/2012 | Katzin | G06Q 30/06 705/14.51 |
| 2012/0278188 A1* | 11/2012 | Attar | G06Q 20/3276 705/17 |
| 2012/0284130 A1* | 11/2012 | Lewis | G06Q 40/00 705/16 |
| 2013/0006850 A1* | 1/2013 | Liebermann | G06Q 20/351 705/39 |
| 2013/0124319 A1 | 5/2013 | Hodge et al. | |
| 2013/0124348 A1* | 5/2013 | Lal | G06Q 20/204 705/17 |
| 2013/0151358 A1* | 6/2013 | Ramalingam | G07G 1/12 705/16 |
| 2013/0238408 A1 | 9/2013 | Cooke et al. | |
| 2013/0282437 A1* | 10/2013 | Cooke | G06Q 30/0224 705/7.31 |
| 2013/0339253 A1* | 12/2013 | Sincai | G06Q 20/3227 705/71 |
| 2014/0081729 A1* | 3/2014 | Ocher | G06Q 30/0222 705/14.23 |
| 2014/0108172 A1* | 4/2014 | Weber | G06Q 20/3823 705/17 |
| 2014/0122268 A1* | 5/2014 | Argue | G06Q 20/20 705/18 |
| 2014/0351071 A1* | 11/2014 | Hong | G06Q 20/204 705/20 |
| 2014/0365368 A1* | 12/2014 | Rosano | G06Q 20/354 705/44 |
| 2015/0006386 A1* | 1/2015 | Tebbe | G06Q 20/3274 705/44 |
| 2015/0026067 A1* | 1/2015 | Abifaker | G06Q 20/04 705/44 |
| 2015/0088755 A1* | 3/2015 | Sobel | G06Q 20/40145 705/71 |
| 2015/0310431 A1* | 10/2015 | Lakshmanan | G06Q 20/3829 705/71 |
| 2015/0310436 A1* | 10/2015 | Lakshmanan | G06Q 20/40 705/71 |
| 2016/0012428 A1* | 1/2016 | Haldenby | G06Q 20/3572 705/39 |
| 2016/0239860 A1* | 8/2016 | Ozawa | G06Q 20/3276 |

OTHER PUBLICATIONS

International Search Report and Written Opinion dated Oct. 30, 2015 in corresponding International Application No. PCT/US2015/043719., Oct. 30, 2015.

* cited by examiner

SIMPLE IN-STORE PAYMENTS

BACKGROUND

Point-of-sale (POS) systems used by retailers to process transaction may be outdated and complex. The payment systems used by POS systems may be deeply integrated, and may not be easily upgradeable. This may make it difficult to integrate new ways of making payments, for example, payments using mobile computing devices such as smartphones, as the new payment types may need to be integrated with the POS system and the payment terminal, may require a change in cashier workflow, or may result in a compromised user experience. Some new payment system may require cashiers to bridge the gap between new payment systems and the retailer's POS systems. A cashier may need to type a transaction total into a new payment system after using the POS system to determine the total. The casher may then get a confirmation of payment from the new payment system, which the cashier must then input into the POS system, for example indicating a payment type of "cash" into the POS system.

Some retailers may use identity-based payment systems. These systems may allow a user, or customer, to make purchases with minimal interaction with a cashier. This may require communication between the user's smartphone and the store's POS system, and it may also require that the store change POS systems or integrate software onto their existing POS system, which may be cost prohibitive, time consuming, or both.

BRIEF SUMMARY

According to an embodiment of the disclosed subject matter, a customer identifier and a point-of-sale identifier may be received. A user payment account may be determined based on the customer identifier. The user payment account may be associated with a customer identified by the customer identifier. Transaction data may be received for a transaction for the customer created using the point-of-sale card at a point-of-sale computing device. The transaction data may include a purchase total. The transaction may be authorized. The point-of-sale card may not always be active. The point-of-sale card associated with the point-of-sale identifier may be activated after the user payment account based on the customer identifier is determined. The point-of-sale card may be deactivated after the transaction is authorized.

Payment of the purchase total may be received from a payment type in the user payment account. The customer identifier and the point-of-sale identifier may be received from an in-store computing device. Payment of the purchase total may be made to a party responsible for the point-of-sale computing device. Payment of the purchase total may be made by charging or debiting an account associated with the point-of-sale card, or by charging or debiting the payment type from the user payment account. The transaction data may be received from a payment processor server. The point-of-sale computing device may be a register with a magnetic card reader. The customer may be checked-in to a store. The check-in may be displayed in an entry on the in-store computing device.

Authorizing the transaction may include sending a portion of the transaction data and account data associated with the payment type from the user payment account to a payment backer server. The payment backer server may be associated with the payment type. An indication from the payment backer server that the payment type can be used to make a payment sufficient to cover the purchase total for the transaction may be received.

The point-of-sale card may be a credit card or debit card including one or more of a magnetic strip and a smart chip, or a near-field-communication (NFC) device. Authorization for a transaction created with the point-of-sale card if the point-of-sale card is deactivated may be declined. The in-store computing device may be a tablet, smartphone, laptop, or smart watch. The point-of-sale identifier may be unique to the point-of-sale computing device, a cashier, or the in-store computing device. The transaction data may include an indication of the point-of-sale computing device at which the point-of-sale card was used.

Authorization for a transaction created with the point-of-sale card may be declined if the indication of the point-of-sale computing device indicates that the point-of-sale card was used on a point-of-sale computing device different from the point-of-sale computing device associated with the point-of-sale identifier. The point-of-sale identifier may be associated with a cashier or with an in-store computing device.

According to an embodiment of the disclosed subject matter, a means for receiving a customer identifier and a point-of-sale identifier, a means for determining a user payment account based on the customer identifier, where the user payment account is associated with a customer identified by the customer identifier, a means for activating a point-of-sale card associated with the point-of-sale identifier, a means for receiving transaction data for a transaction for the customer created using the point-of-sale card at a point-of-sale computing device, where the transaction data includes a purchase total, a means for authorizing the transaction, a means for receiving payment of the purchase total from a payment type in the user payment account, a means for deactivating the point-of-sale card, a means for making payment of the purchase total to a party responsible for the point-of-sale computing device, a means for authorizing the transaction including a means for sending at least a portion of the transaction data and account data associated with the payment type from the user payment account to a payment backer server, wherein the payment backer server is associated with the payment type and a means for receiving an indication from the payment backer server that the payment type can be used to make a payment sufficient to cover the purchase total for the transaction, a means for declining to authorize a transaction created with the point-of-sale card if the point-of-sale card is deactivated, and a means for declining to authorize a transaction created with the point-of-sale card if the indication of the point-of-sale computing device indicates that the point-of-sale card was used on a point-of-sale computing device different from the point-of-sale computing device associated with the point-of-sale identifier, are included.

A means for receiving a check-in, where the check-in includes data indicating the identity of a customer, a means for displaying an entry including the data indicating the identity of the customer in a list of entries for checked-in customers, a means for receiving a selection of the entry for the customer, a means for sending a customer identifier based on the selected entry for the customer and a point-of-sale identifier to a payment server, and a means for identifying the customer as being at a cashier's station based on a location of the customer computing device, are also included.

Systems and techniques disclosed herein may allow for simple in-store payments. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
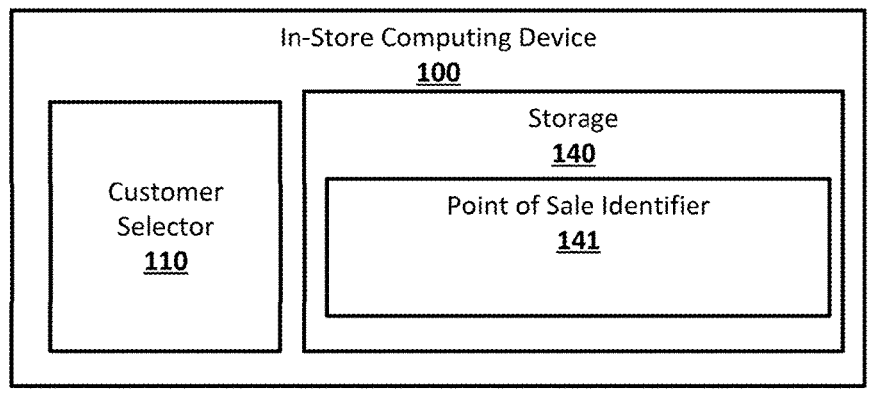
FIG. 1 shows an example system suitable for simple in-store payments according to an implementation of the disclosed subject matter.

Simple in-store payments may allow for customers to make payments at a Point-of-Sale (POS) without requiring the customer to present or hand to a cashier a credit card, debit card, or other form of payment, and without requiring modifications to existing Point-of-Sale systems. At a specific POS computing device, such as, for example, a register at the front of a store with an attached credit/debit card reader, a cashier may have access to a computing device, such as a tablet, that is separate from the POS computing device. When a customer enters the store, the customer may check-in to the store using their own mobile computing device, such as, for example, a smartphone. The cashier's computing device may display a list with entries for all customers checked-in to the store, including, for example, the customer's name and a photograph of the customer's face. To make a purchase, the customer may go up to the cashier and identify themselves by name. The cashier may locate the customer on the list of checked-in customers, using the photograph on the cashier's computing device to verify the identity of the customer. Once the customer's identity has been verified, the cashier may select the entry for the customer. This may notify a remote server on which the customer has a stored payment account that the customer is making a purchase at the store. The cashier may have a magnetic swipe card, for example, a credit card, that is tied to the particular POS computing device. The cashier's computing device may identify the POS computing device to the remote server, which may activate the credit card, for example, by noting that the credit card is now active for any transaction sent by the POS computing device in a database of active and inactive cards stored on the remote sever. The cashier may ring up the customer's purchases on the POS computing device as usual, for example, with a bar code scanner or manual entry of purchases, and then swipe the magnetic swipe card through the credit/debit card reader, as if it were a credit card that had been handed to them by the customer. The transaction may be sent to the store's payment processor, which may verify payment with the remote server. The remote server, upon receiving the transaction from the payment processor, may check the customer's payment account to ensure that the customer can pay for the purchases. The transaction may then be verified and payment may be made from the remote server to the payment processor. The remote sever may either route the transaction to the form of payment in the customer's payment account, or may front the money for the transaction to the store through the payment processor and then bill the form of payment in the customer's payment account at a later time. The magnetic swipe card may then be deactivated. In this way, a customer may pay for items using a payment account stored on a remote payment server without having to present any form of payment to a cashier or touch their smartphone, and the cashier may process the transaction using an existing unmodified POS computing device, as the transaction may be processed in a similar manner as any other credit or debit card transaction.

A POS computing device, such as a register, may be a computing device capable of processing transactions for a store. The POS computing device may be able to receive payment, either in the form of cash handed to a cashier who the inputs the amount into the POS computing device, or through a credit or debit card swiped through a magnetic card reader attached to the POS computing device. A cashier stationed at a POS computing device may be given a separate computing device, such as, for example, a tablet, smartphone, or smart watch. The cashier's computing device may run an application that can display entries for customers who have checked-in to the store. The cashier's computing device may also store an identifier that uniquely identifies the POS computing device at which the cashier is stationed.

A customer who enters the store may have a mobile computing device, such as a smartphone. The customer may use the smartphone to check-in to the store. For example, the smartphone may run an application which may be configured to check-in to the store automatically, for example, based on geolocation or other signals or based on the customer affirmatively checking-in to the store. The checked-in customer may have an entry appear on a list of checked-in customers of the cashier's separate computing device, which may be running an application that works in conjunction with the application on the customer's computing device. The check-in may occur locally, for example, over a direct or LAN based WiFi or Bluetooth connection between the customer's computing device and the cashier's computing device, or may be processed remotely, for example, through a remote server managed by the party responsible for the check-in applications. The entry that appears on the cashier's computing device may include any suitable data that may be useful to the cashier for verifying the identity of the customer, such as, for example, the name of the customer and a photograph of the customer's face.

The customer may have a payment account stored on a remote server. For example, any suitable party, such as the party responsible for the check-in applications, may run a payment service that stores various types of payment information for users of the service. For example, a user of the service may store credit card, debit card, bank account, pre-paid account, or post-paid account data with the service. The payment information may be stored in an account for the user on a remote server. The user may be able to use the service to, for example, purchase items from online stores without having to re-enter payment data for different stores or different purchases, as the user may direct the online store to use one of the forms of payment stored in the user's payment account.

The POS computing device at which the cashier is stationed may have an associated POS card, which may be, for example, a magnetic swipe card such as a credit card. The magnetic swipe card may include a number and other account information for a valid credit or debit account. The account may be held by, for example, the party responsible for the check-in application and the payment service. The account may be a credit account, for example, backed by any suitable credit card issuer, or a debit account linked to a bank account belonging to, for example, the party responsible for the payment service. The POS card may be swiped at any magnetic card reader meant for credit cards, and the information on the credit card may be processed by any payment processor. The remote server, which may be the same server as the payment server of may be connected to the payment server, may store the number for the POS card and an indication of whether the POS card is active or inactive. The remote server may be able to activate and deactivate the POS card, for example, changing the indication in the remote server database, or changing the status of the POS card with the credit card issuer.

When active, the POS card may function like any other credit card, and may be used to make purchases, withdrawing from or debiting the account, for example, an account held by the party responsible for the payment server, to which the card is linked in order to make payments. The transaction may be processed through a payment processor that is capable of processing any other credit or debit card transactions. The payment processor may receive the card data and check the status of the account for the POS card with the credit card issuer or with the remote server, which may indicate that the card is active. The account for the POS card may then be charged or debited as any other credit or debit card.

When inactive, the POS card may not be used to make payments. When an inactive POS card is used to attempt to make a payment, for example, by being swiped at a magnetic card reader, the payment processor may determine that the POS card has been inactivated based on data received when the payment processor attempts to process the payment through the credit card issuer or the remote server. The determination that the POS card is inactive may be made by the payment processor, or may be made by the card issuer, which may refuse to authorize a transaction for an inactive POS card. This may result in the transaction failing, as the account linked to the POS card cannot be charged or debited when the POS card is inactive. The POS card may be inactive be default, for example, when the POS card is first given to the cashier.

The customer may make purchases at the store by approaching the cashier and identifying themselves, for example, by name. The cashier may check the entries on the cashier's computing device for customers who are checked-in to the store, and locate the customer who is making the purchase. For example, the cashier may look-up the appropriate entry based on the name given by the customer, and then may match the photograph in the entry to the customer's face. The cashier may only proceed with the transaction if the cashier can positively match the entry on the cashier's computing device to the customer attempting to make a purchase.

The cashier may select the entry on the cashier's computing device for the customer attempting to make the purchase. For example, the cashier may use a touchscreen to select the entry for the customer, or may select the entry through any other suitable control element, such as a button or menu item associated with the entry for the customer. The cashier's computing device may send data to the remote server including the identity of the customer whose entry was selected and the unique identifier for the POS computing device at which the cashier is stationed. The remote server may then activate the POS card associated with the POS computing device. For example, the remote server may activate, or may send an indication to the credit card issuer for the POS card to activate, the POS card. An activated POS card may be used at any POS computing device while active. The remote server may be able to indicate that the POS card should be active only for a transaction that originates from a POS computing device with the unique identifier for the POS computing device at which the device is stationed. This may prevent the POS card from being used for any other transactions at any other POS computing devices while the card is active, as the credit card issuer or remote server may only verify a transaction for the POS card if the transaction originates at the cashier's POS computing device. The remote server may send an indication to the cashier's computing device that the POS card has been activated, and the cashier's computing device may display to the cashier the status of the POS card. The remote server may also link the POS card to a payment account for the customer on the payment server, which may be the same server as the remote server. The remote server may also send a notification to the customer, for example, sending a text message to the customer's phone, indicating that the customer's payment account has been linked to the POS card.

The cashier may determine the purchase total for the customer as usual, for example, scanning bar codes of products or entering products or purchase amounts manually into the POS computing device. Once the purchase total has been determined, the cashier may confirm the purchase with the customer, for example, verbally, and then may swipe the POS card through the magnetic card reader attached to the POS computing device. The POS computing device may process the transaction as if it were any other credit or debit card, sending the appropriate information from the POS card to the store's payment processor. Because the POS card is active, the payment processor may be able to verify the POS card's account with the credit card issuer or with the remote server, and may be able to charge or debit the account to pay the store the purchase total. The remote server may be notified that the transaction has been started, and may verify that the transaction originated from the POS computing device with which the POS card is associated, even when the credit card issuer and not the remote server confirms the payment to the payment processor. The payment processor may confirm payment to the POS computing device, which may print a receipt for the transaction as usual, or a receipt may be sent to the customer based on the information in the customer's payment account, for example, via email. The remote sever may deactivate the POS card once the transaction has been processed. This may prevent the POS card from being used in any situation where the POS card has not been activated by the remote server and linked to a customer payment account based on data received from the cashier's computing device. The POS card may be used with any POS computing device while active. In some implementations, the POS card may not be used with a POS computing device that the POS card is not associated with on the remote server The remote server may also verify that the customer can pay for their purchases during the processing of the transaction. For example, the customer's payment account on the payment server may include data for a credit card account held by the customer. The remote server may perform a check with the issuer of the customer's credit card during the transaction process to determine if the customer has enough credit to pay for their purchase. If the customer does not have enough credit, the remote server may deny the transaction.

The remote server may be able to charge or debit specific payment types in the customer's payment account that was linked to the POS card during the transaction. For example, the remote server may charge the customer's credit card, for which the customer stored payment information in their payment account, for the same purchase total that was charged to the POS card, either during the transaction, or at a later time. Similarly, the remote server may be able to debit a bank account for which the customer has stored payment information on the payment server, or charge a pre-paid or post-paid account. The customer may be able to specify, for example, through the configuration of their payment account, which types of payment should be used at different stores. For example, the customer may specify that any payment made at a gas station using a POS card linked to the customer's payment account should be paid using stored data for the customer's credit card, while any payment made at a grocery store should be paid using the stored data for the customer's debit card. The customer may also be able to specify which type of payment to use to the cashier at the time of the transaction. The cashier may be able to use the cashier's computing device to indicate to the remote server which type of payment should be used from the customer's payment account.

The remote server may also be able to link the transaction directly to the customer's payment account. This may allow the POS card to link directly one of the types of payment in the customer's payment account, so that the customer's payment account is charged or debited directly instead of the POS card, even though the POS card is still swiped at the POS computing device by the cashier instead of any of the customer's payment cards. For example, the customer's personal credit card may be charged for the purchase total when the POS card is swiped at a register where the customer has been identified by the cashier.

Other suitable devices may be used instead of magnetic swipe card as a POS card. For example, the cashier may use a credit card with a microchip that can be read by a chip reader attached to the POS computing device. The cashier may also use a form of contactless payment, for example, a contactless fob that can be read by a near field communication (NFC) reader attached to the POS computing device.

The unique identifier may, instead of identifying the POS computing device, be unique to the cashier's computing device. This may create a 1:1 mapping between the cashier and the POS card, enabling the cashier to use different POS computing devices with the same POS card. The cashier may have possession of the computing device, for example, a smart watch worn by the cashier, or the cashier may sign in to a cashier's computing device at whichever station the cashier is using. The customer may also be identified to the cashier using, for example, a QR code scanned by the customer at the cashier's station, an NFC reader at the cashier's station activated by the customer's personal computing device, or through video analysis and facial recognition or through locating of the customer within the store using Bluetooth Low Energy signals, NFC signals, or other suitable signals, that may be used to determine when the customer is at a particular cashier's station or in a check-out lane.

The POS card may always be active, and may be soft deactivated, such that a transaction originating with the POS card may always be rejected when the POS card has not been associated with a payment type from a customer payment account. This may not require explicit activation or deactivation of the POS card by the remote server. The POS card may also be active, and not soft-deactivated. The POS card may be tied to the cashier, and the cashier may be considered responsible for all transactions originated with the POS card.

The POS computing device or cashier's computing device may present information to the cashier regarding the creditworthiness of the customer. For example, the list of checked-in customers may include indications of how much a particular is authorized to spend based on the payment types in their payment account. Some customers may have no spending limit, others may have a set spending limit, and others may not be able to make purchases at all. The cashier may then determine whether or not to allow the customer to make a purchase with a particular purchase total, and may swipe or not swipe the POS card. Credit checking may also be performed after the purchase has been made using the POS card. Any customer in good standing may be allowed to check in and to make a purchase of any size. Reconciliation may be performed asynchronously from either the check-in activity or the payment processing activity.

FIG. 1 shows an example system suitable for simple in-store payments according to an implementation of the disclosed subject matter. An in-store computing device 100 may include a customer selector 110 and a storage 140. The in-store computing device 100 may be any suitable device, such as, for example, a computer 20 as described in FIG. 8, for implementing the customer selector 110 and the storage 140. The in-store computing device 100 may be a single computing device, or may include multiple connected computing devices, and may be, for example, a smartphone, tablet, laptop, smart watch, or other computing device that may be used by a cashier in a store. The customer selector 110 may be any suitable application that may run on the in-store computing device 100 and may allow a cashier to view information, such as names and photographs, of customers who are checked-in to the store, select a specific customer, and communicate the identity of the selected customer to a remote server. The storage 140 may store a point of sale (POS) identifier 141 in any suitable manner. The POS identifier 141 may be a unique identifier for a POS computing device, or may be a unique identifier tied to the in-store computing device 100 and the cashier using the in-store computing device 100.

The in-store computing device 100 may be a computing device assigned to a specific POS computing device in a store. For example, the in-store computing device 100 may be a tablet assigned to a register at a particular check-out station or aisle within a store. The in-store computing device 100 may also be assigned to a specific cashier instead of to a specific POS computing device. For example, the in-store computing device 100 may be a smart watch assigned to a particular cashier. The POS identifier 141 may identify either the POS computing device to which the in-store computing device 100 is assigned, or may identify the in-store computing device 100 and cashier to which the in-store computing device 100 is assigned.

The customer selector 110 may by any suitable combination of hardware and software on the in-store computing device 100 for displaying a list of customers checked-in to the store in which the in-store computing device 100 is located. For example, the customer selector 110 may receive check-ins directly from customer's personal computing device, for example, through a direct wireless connection, such as Bluetooth, through a local network, or through the use of a remote server which may receive the check-in from the customer's personal computing device and rely the check-in to the in-store computing device 100 for display on the customer selector 110. The customer selector 110 may allow the cashier to view information about checked-in customers, including, for example, a photograph of each of the customers, which may allow the cashier to identify a customer attempting to make a purchase at the cashier's station. The customer selector 110 may be able to communicate with a remote server, and may send the remote server the identity of a customer selected from the list of checked-in customers by the cashier and a the POS identifier 141 from the storage 140.

Figure 2:
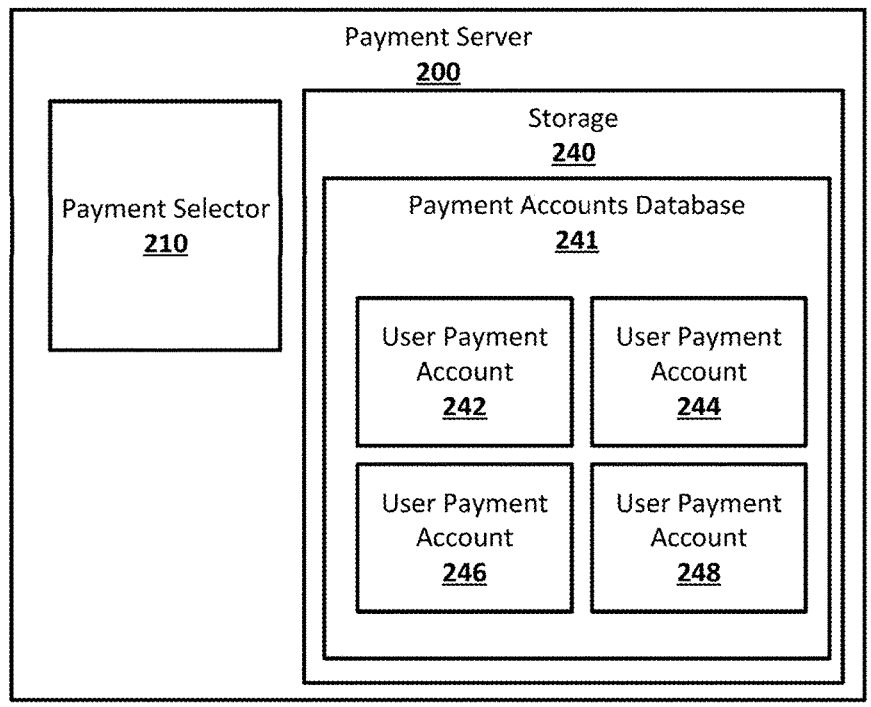
FIG. 2 shows an example system suitable for simple in-store payments according to an implementation of the disclosed subject matter.

FIG. 2 shows an example system suitable for simple in-store payments according to an implementation of the disclosed subject matter. A payment server 200 may include a payment selector 210 and a storage 240. The payment server 200 may be any suitable device, such as, for example, a computer 20 as described in FIG. 8, for implementing the payment selector 210 and the storage 240. The payment server 200 may be a single computing device, or may include multiple connected computing devices, and may be, for example an individual server, a server farm, or distributed server system. The payment selector 210 may be any suitable application that may run on the payment server 200 and may link a customer identity received, for example, from the customer selector 110 on the in-store computing device 100, to one of the user payment accounts 242, 244, 246, and 248 in the payment accounts database 241 in the storage 240. The payment selector 210 may also be able to activate a POS card, verify payment of a purchase total, for example, to a payment processor, and authorize a type of payment stored in the user payment accounts 242, 244, 246, and 248 with a payment backer. The storage 240 may store the payment accounts database 241, and the user payment accounts 242, 244, 246, and 248, in any suitable manner.

The payment account database 241 may be any suitable database for storing payment accounts for users such as, for example, the user payment accounts 242, 244, 246, and 248. For example, a user may establish an account with a payment service on the payment server 200. The user may input information that can be used to access forms of payment, such as credit cards, debit cards, bank accounts, and other forms of online payment, that the user would like to have accessible through the payment service. For example, the user payment account 242 may include information, such a credit card issuer, account number, expiration date, name of the credit card holder, and billing address, that can be used to charge one of the account owner's credit cards. User payment accounts such as the user payment account 242 may include information for several types of payments, and may also include priorities or rules established by the account owner that may specify which types of payments in the user payment account 242 should be used for different types of transactions from different types of merchants. Some of the payment types may include, for example pre-paid accounts which may have stored value that can be used for payment.

The payment selector 210 may be any suitable combination of hardware and software on the payment server 200 for activating and deactivating a POS card, verifying payment to payment processors, accessing payment information from the user payment accounts 242, 244, 246, and 248 based on the identity of a customer, and verifying a customer's ability to make payments with a payment type stored in a user payment account for that customer. For example, the payment selector 210 may receive the identity of a customer making a purchase at POS computing device from the in-store computing device 100 associated with that POS computing device or cashier assisting the customer. The payment selector 210 may also be able to receive the POS identifier 141. The POS identifier 141 may be used to identify a POS computing device or cashier, along with an associated POS card. The payment selector 210 may be able to activate and deactivate the POS card as necessary. For example, the payment selector 210 may activate a POS card when the POS identifier 141 associated with the POS card is received from the in-store computing device 100.

The payment selector 210 may also be able to receive transaction data from a payment processor. For example, when the POS card is swiped at the POS computing device associated with the in-store computing device 100, the payment processor may, based on the account information stored on the POS card, attempt to verify the transaction with the payment server 200. The payment selector 210 may receive the transaction data and effect payment to the payment processor, so that the store can receive payment. The payment selector 210 may be able to link the transaction directly to a one of the payment types on the user payment account, for example, the user payment account 242, for the customer attempting to make the purchase. This may result in the payment type being charged or debited directly. The payment selector 210 may also authorize payment from an account held by, for example, the party responsible for the payment server 200, and may charge or debit the customer's payment type from the user payment account 242 at a later time.

Figure 3:
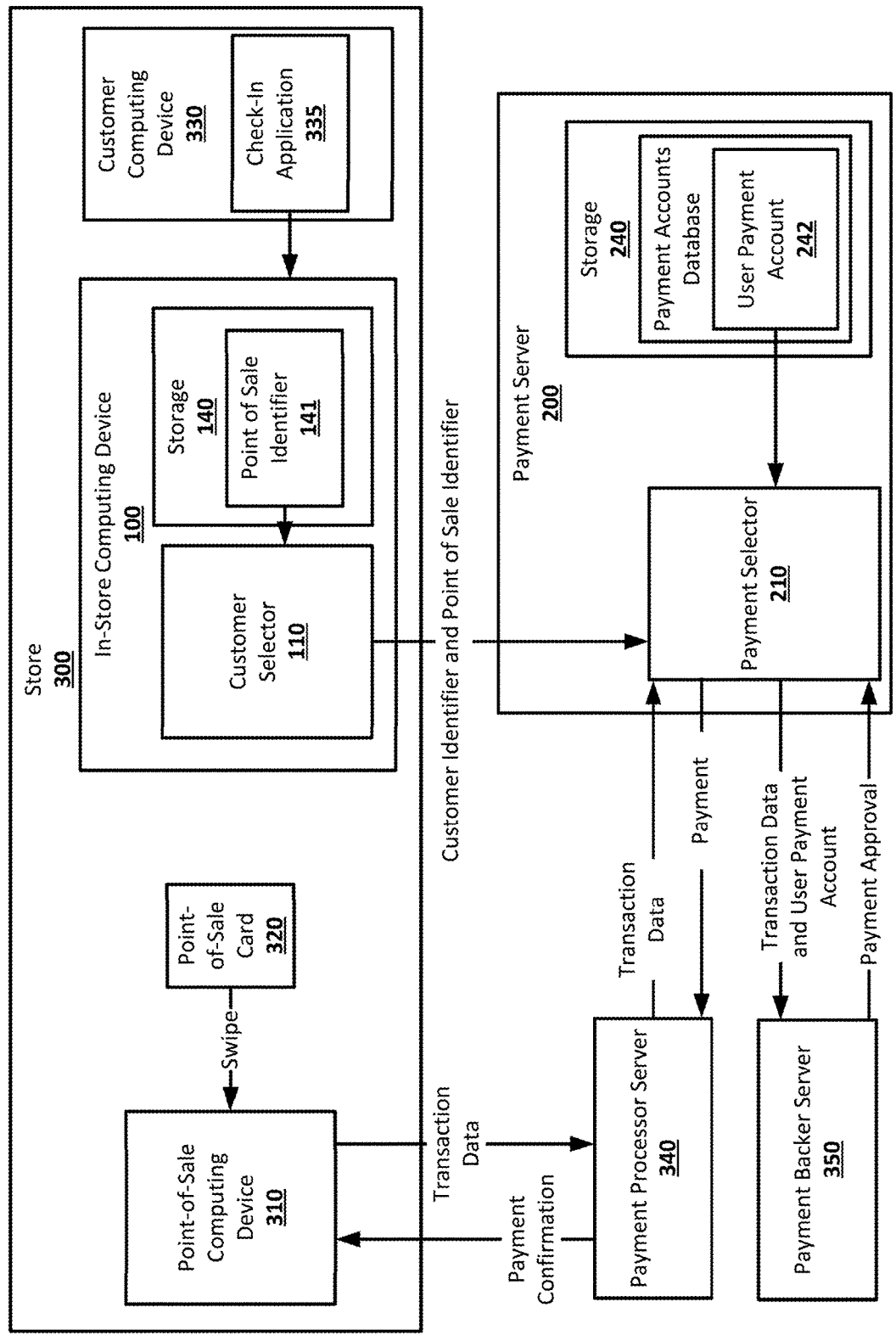
FIG. 3 shows an example of arrangement for simple in-store payments according to an implementation of the disclosed subject matter.

FIG. 3 shows an example of arrangement for simple in-store payments according to an implementation of the disclosed subject matter. A customer may enter a store 300, which may be any fixed or movable location that allows purchases to be made on the premises using any suitable device as a POS computing device 310, such as, for example, a register. The POS computing device 310 may be stationary, or may be a mobile device, such as, for example a handheld POS terminal. The store 300 may be a fixed location, such as retail store in a building, or may be mobile, for example, a food truck or taxi. The customer may have with them a customer computing device 330, which may be any suitable computing device carried by the customer, such as, for example, a smartphone, tablet, or smart watch. The customer computing device 330 may run a check-in application 335. The check-in application 335 may be used to check the customer in to the store 300, for example, automatically or based on input from the customer to the customer computing device 330, such as, for example, the customer tapping a button, or the customer saying a phrase recognized using voice recognition as initiating a check-in. The check-in application 335 may communicate directly with the in-store computing device 100, or the in-store computing device 100 may receive the customer's check-in through a remote server, such as, for example, the payment server 200. For a mobile store 300, the check-in may be based on geofencing, proximity detection, or the comparison of the location of the mobile store 300 and the customer computing device 330 to ensure that the customer computing device 330 is actually present at the mobile store 300. The customer selector 110 may display a list of customers checked-in at the store 300. The list may include an entry for each customer, including information that can be used to identify the customer. The list may be unsorted, or sorted based on any suitable criteria, such as, for example, customer name, amount of time customer has been checked-in to the store, or proximity of the customer to the cashier station. The information displayed by the customer selector 110 may come from the check-in application 335, or from an account associated with the customer on a remote server, for example, an account on the payment server 200 or an account within an umbrella ecosystem that includes other services such as email and cloud storage.

The customer may approach a cashier stationed at the POS computing device 310 to make a purchase. For example, the customer may have retail products, or may have ordered food or services. The customer may identify themselves to the cashier, for example, by name. The cashier may check the list of customers who are checked-in to the store 300 as displayed by the customer selector 110 on the in-store computing device 100 to find an entry for the customer at the cashier's station, for example, based on the customer's name. Once the cashier has located the appropriate entry, the cashier may use other information from the entry, for example, a photograph of the customer, to confirm that the customer standing at the cashier's station attempting to make a purchase matches the customer identified by the entry displayed by the customer selector 110. After confirming the customer's identity, the cashier may select the entry for the customer in the customer selector 110.

The customer selector 110 may send, using any suitable communications channels, the identity of the selected customer and the POS identifier 141 to the payment server 200. The payment selector 210 may use the POS identifier 141 to determine that the POS card 320, which may be associated with the POS computing device 310 identified by the POS identifier 141, should be activated. The POS card 320 may be activated by changing an indication in a database on the payment server 200, or by indicating to the server systems of an issuer or financial backer of the POS card 320 that the POS card 320 should be activated. The payment selector 210 may use the identity of the selected customer to locate a user payment account, for example, the user payment account 242, for which the selected customer is the account owner. The payment selector 210 may link the next transaction received from the now-active POS card 320 to the user payment account 242.

The cashier may determine the purchase total for the customer as usual using the POS computing device 310, for example, scanning products with a bar code or keying in purchased goods or services. The cashier may then verify with the customer that they wish to pay the purchase total, and swipe the POS card 320 through the POS computing device 310, for example, using a magnetic card reader attached to the POS computing device 310. The POS card 320 may include credit or debit card data for an account owned by, for example, the party responsible for operating the payment server 200, and may be processed by the POS computing device 310 the same as any other credit or debit card. Transaction data, including the account information from the POS card 320, along with purchase information including the purchase total, may be sent a payment processor server 340, which may be the server system for the payment processor used by the store 300 to handle all credit and debit card transactions. The transaction data may also include an identifier for the POS computing device 310. The payment processor server 340 may process the transaction data normally. Based on the account information for the POS card 320 in the transaction data, the payment processor server 340 may attempt to authorize the transaction for the POS card 320 with the payment server 200. The payment server 200 may receive the transaction data from the payment processor server 340, and may check to determine that the POS card 320 is active and that a user payment account, for example the user payment account 242, has been linked to the transaction from the POS card 320. The payment server 320 may then determine, by checking with the payment backer sever 350, whether the appropriate payment type from the user payment account 242 can handle the purchase total. For example, the user payment account 242 may include credit information for the customer attempting to make the purchase, and may indicate that the credit card should be used for all purchases made by the customer from the store 300. The payment server 200 may check the payment backer server 350, which may be a server run by the issuer of the credit card, to determine if the customer's credit card has enough credit available to cover the purchase total. The payment server 200 may send the payment backer server 350 the transaction data and user payment account data for the selected payment, and may receive approval from the payment backer server 350 when the customer has enough available credit or funds to cover the purchase total.

The payment server 200 may authorize payment to the payment processor server 340 if the POS card 320 is active and there is a linked user payment account 242 with a payment type that can cover the purchase total. The payment processor server 340 may then confirm payment to the POS computing device 310 of the purchase total, completing the purchase. The customer may receive a printed receipt from the POS computing device 310, or may receive an emailed receipt for example, from the payment server 200.

Money to complete the transaction may be transferred to an account of the store 300 from the account for the POS card 320, either during the completion of the transaction or at a later time. For example, the POS card 320 may be a credit card, and the card issuer may charge the account. The balance of the account of the POS card 320 may be paid off by the account owner, which may be the party responsible for the payment server 200. The party responsible for the payment server 200 may then be repaid the purchase total by the customer using the user payment account 242, either contemporaneously, or at a later time. The payment selector 210 may also link the payment type from the user payment account 242 directly to the transaction from the POS card 320. In this case, the transaction from the POS computing device 310 would be paid for by the payment backer responsible for the payment backer server 350, for example, directly charging a credit card stored in the user payment account 242 or withdrawing funds from a bank account stored in the user payment account 242. The POS card 320 may not need to be charged or debited, and the transaction may appear on the statement of the payment type from the user payment account 242, for example, a monthly credit card statement, as if the customer had swiped the physical credit card for account at the POS computing device 310.

After the transaction has been processed and payment has been confirmed to the POS computing device 310, the payment selector 210 may deactivate the POS card 320. Any transaction attempted with the deactivated POS card 320 may be rejected by the payment processor, as the payment server 200 or card issuer may not authorize a transaction received from a payment processor when the transaction includes account information for the deactivated POS card 320.

Figure 4:
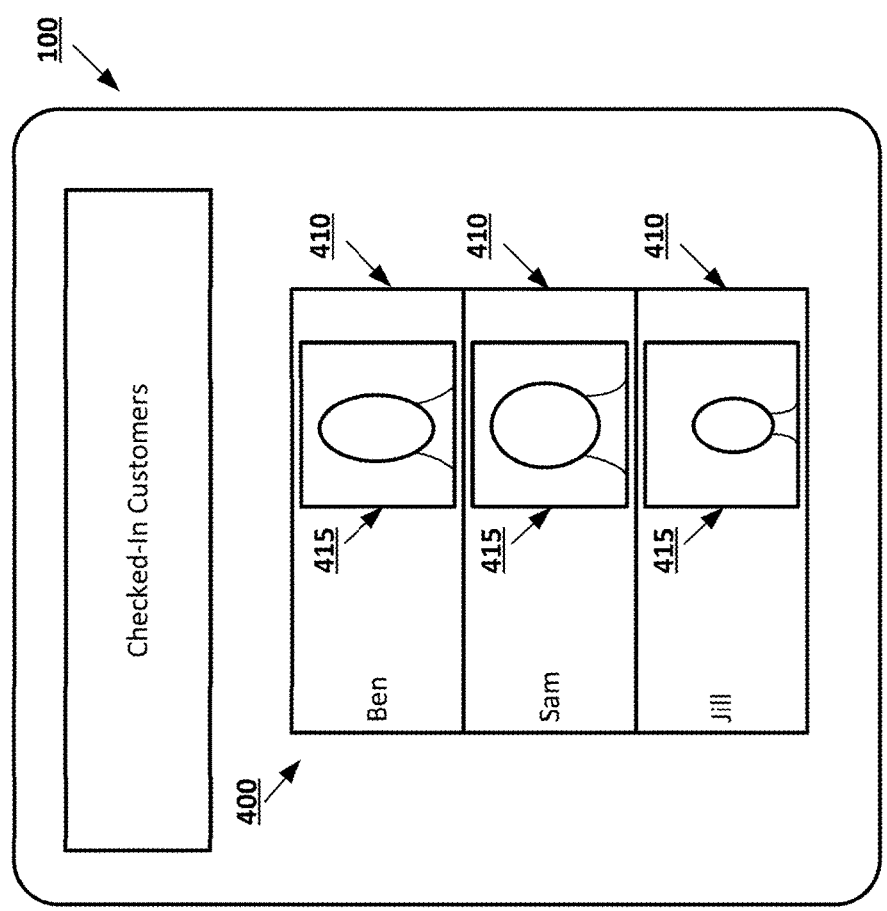
FIG. 4 shows an example of an in-store computing device for simple in-store payments according to an implementation of the disclosed subject matter.

FIG. 4 shows an example of an in-store computing device for simple in-store payments according to an implementation of the disclosed subject matter. The in-store computing device 100 may be, for example, a tablet computing device. The customer selector 110 may run on the in-store computing device 100, and may display a list of checked-in customers 400. The list of checked-in customers 400 may display an entry 410 for each customer who has checked in to the store 300 using, for example, the check-in application 335 on their customer computing device 330. Each entry 410 may include information that can be used by the cashier to identify the customer when the customer approaches the cashier's station to make a purchase. For example, each entry 410 may include a photograph 415 of the customer, which may be taken from, for example, an account the customer owns in an umbrella ecosystem. The cashier may use the photograph to determine if a customer who has approached the cashier station to make a purchase is the person they claim to be. The cashier may also select an entry 410 on the list of checked-in customers 400 to indicate to the payment server 200 the identity of the customer making a purchase at the cashier's station, so that the payment server 200 may locate the correct user payment account 242, 244, 246 or 248 to link to the transaction, to ensure the customer makes payment for the purchase after the transaction is completed using the POS card 320 at the POS computing device 310. If the cashier is unable to identify the customer based on an entry 410, for example, because the customer's face does not match the face in the photograph of the entry 410 with the name given by the customer, the cashier may stop the transaction. Other suitable devices may also be used as the in-store computing device 100. For example, laptop, smartphone, or smart watch may also be used.

Figure 5:
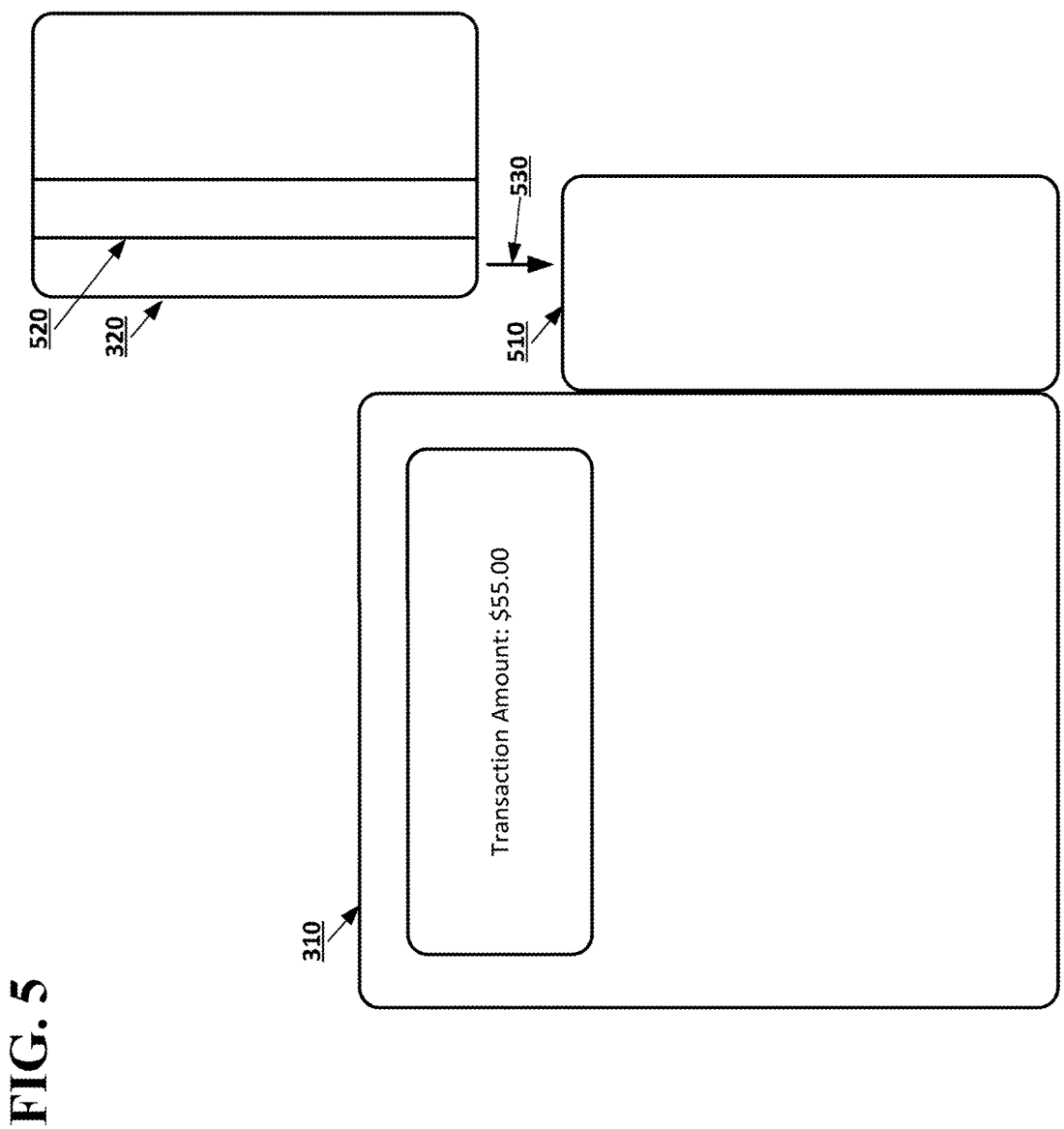
FIG. 5 shows an example of a point-of-sale card and point-of sale computing device for simple in-store payments according to an implementation of the disclosed subject matter.

FIG. 5 shows an example of a point-of-sale card and point-of sale computing device for simple in-store payments according to an implementation of the disclosed subject matter. The POS computing device 310 at the cashier's station may be any suitable device for processing transactions at the point-of-sale, such as, for example a register with an attached magnetic card reader 510. The magnetic card reader 510 may be any standard magnetic card reader for reading swiped credit and debit cards. The POS card 320 may include magnetic stripe 520. When the POS card 320 is swiped through the magnetic card reader 510, in the direction 530, the magnetic card reader 510 may read account information for the POS card 320 from the magnetic stripe 520, similar to any other credit card or debit card with a magnetic stripe. This may allow existing POS computing devices 310 to be used with the POS card 320, without requiring any additional hardware be added to or additional software to be integrated with the POS computing device 310. Other existing POS computing device 310 hardware may also be used. For example, instead of the magnetic card reader 510, the POS computing device 310 may have a smart chip reader or an NFC reader, and the POS card 320 may include a smart chip, or may be an NFC fob.

Figure 6:
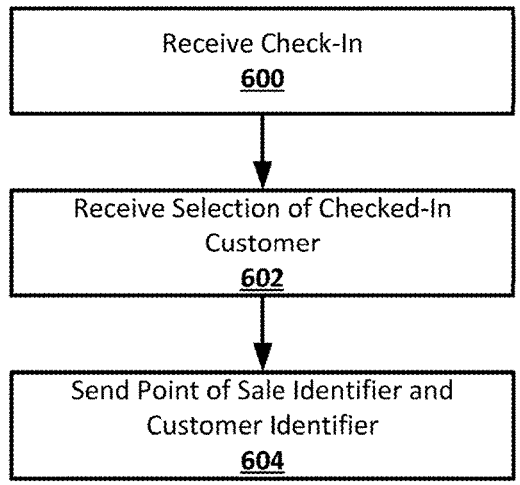
FIG. 6 shows an example of a process for simple in-store payments according to an implementation of the disclosed subject matter.

FIG. 6 shows an example of a process for simple in-store payments according to an implementation of the disclosed subject matter. At 600, a check-in may be received. For example, the customer selector 110 on the in-store computing device 100 may receive a check-in from customer who has entered the store 300. The check-in may originate from the check-in application 335 on the customer computing device 330. For example, a customer who enters the store 300 may use the check-in application 335 on their smartphone to check-in to the store 300. The check-in may be received directly from the customer computing device 330, or may be relayed through a remote server, for example, the payment server 200, that may run a check-in service with which the customer has an account. The check-in may include information about the customer, such as name and photograph, which may be displayed in an entry 410 for the customer on the in-store computing device 100.

At 602, a selection of a checked-in customer may be received. For example, the cashier may select one of the entries 410 on the list of check-in customers 400 displayed by the customer selector 110 on the in-store computing device 100. A customer may approach the cashier's station to attempt to make a purchase. The cashier may identify the entry 410 for the customer based on, for example, the customer's name and photograph 415 in the entry 410. The cashier may then select the entry 410, for example, tapping on the entry 410 on the touchscreen of a tablet.

At 604, a point-of-sale identifier and customer identifier may be sent. For example, the in-store computing device 100 may send the POS identifier 141, which may identify the POS computing device 310 at which the cashier is stationed, or the cashier themselves, along with data identifying the customer whose entry 410 was selected, to the payment server 200. The POS identifier 141 and the customer data may be used by the payment server 200 to activate the POS card 320 associated with the POS computing device 310 or the cashier.

Figure 7:
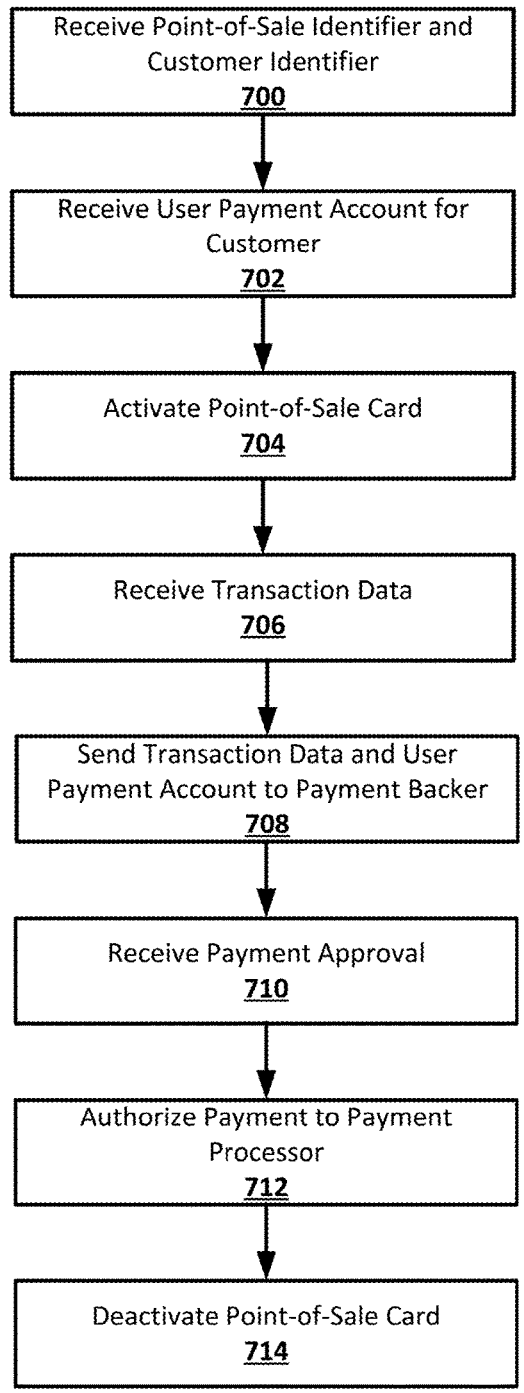
FIG. 7 shows an example of a process for simple in-store payments according to an implementation of the disclosed subject matter.

FIG. 7 shows an example of a process for simple in-store payments according to an implementation of the disclosed subject matter. At 700, a customer identifier and point-of-sale identifier may be received. For example, the payment server 200 may receive, from the in-store computing device 100, the POS identifier 141 for the POS computing device 310 associated with, or the cashier using, the in-store computing device 100. The payment server 200 may also receive the customer identifier, which may include data identifying the checked-in customer that the cashier selected on the customer selector 110. The customer may be attempting to make a purchase at the cashier's station.

At 702, a user payment account for the customer may be received. For example, the payment server 200, and payment selector 210, may use the customer identifier to determine if an account in the payment accounts database 241 belongs to the identified customer. The customer identifier may include account information that may be specific to the payment server 200, or may be for an umbrella ecosystem. For example, the customer identifier may include an email address belonging to the customer that may also be the customer's username for an account in an umbrella ecosystem. The payment server 200 may locate the user payment account, for example, the user payment account 242, which belongs to the identified customer.

At 704, a point-of-sale card may be activated. For example, the payment selector 210 on the payment server 200 may determine that the POS card 320 is associated with the POS identifier 141. The payment server 200 may then activate the POS card 320, for example, changing an indication in a database on the payment server 200 or at the card issuer's server to indicate the POS card 320 is active and transactions made using the POS card 320 can be processed.

At 706, transaction data may be received. For example, the cashier may swipe the POS card 320 at the POS computing device 310 after determining the purchase total for the identified customer. This may generate a transaction that may be processed through, for example, the payment processor server 340. The payment processor server 340 may receive the account information from the POS card 320 and attempt authorize the charging or debiting of the account for the purchase total with, for example, the payment server 200. The payment processor server 340 may send the transaction data, including the purchase total, the account information from the POS card 320, and an identifier for the originating store 300 and POS computing device 310, to the payment server 200.

At 708, transaction data and a user payment account may be sent to a payment backer. For example, the payment selector 210 of the payment server 200 may send the transaction data, including the purchase total, to the payment backer server 350 for the payment type being used from the user payment account 242, along with data identifying the account for the payment type to the payment backer server 350. For example, a credit card account stored in the user payment account 242 may be checked with the credit card issuer to determine if the customer has enough available credit to cover the purchase total received from the payment processor 340. The payment backer server 350 may be the server for the credit card issuer, and may check the credit card account and notify the payment server 200 as to whether the customer has enough available credit.

At 710, payment approval may be received. For example, the payment selector 210 of the payment server 200 may receive approval from the payment backer server 350, indicating that the selected payment type from the user payment account 242 has enough credit or funds to cover the purchase total.

At 712, payment may be authorized to the payment processor. For example, the payment selector 210 may determine that the transaction data included account information from the POS card 320, which was activated, and originated from the store 300 and POS computing device 310 or cashier associated with the POS identifier 141. The payment selector 210 may indicate to the payment processor serve 340 that the transaction is authorized, and the account for the POS card 320 may be credited or debited for the purchase total, which may be transferred to the store 300. The POS computing device 310 may receive notification from the payment processor 340 that the transaction was authorized and payment has been, or will be, made to the store 300, completing the transaction at the POS computing device 310. The payment to the store 300 may be made using the account for the POS card 320, for example, a credit, debit, or bank account owned by the party responsible for operating the payment server 200. The payment selector 210 may then collect the purchase total from the user payment account 242, either directly charging or debiting the payment type from the user payment account 242, or by sending the customer a bill for the purchase total that the customer may pay using the user payment account 242 or other suitable payment type. The payment may also be made by directly linking the transaction to the payment type from the user payment account 242, directly charging or debiting the payment type for the purchase total.

At 714, the point-of-sale card may be deactivated. For example, the payment selector 210 may deactivate the POS card 320, for example, changing the indication in the database on the payment server 200 or the card issuer's server to reflect that the card is now inactive. This may prevent the POS card 320 from being used until it has been reactivated, for example, when another customer attempts to make a purchase at the cashier's station. This may result in every transaction made with the POS card 320 being linked both to a customer who has checked-in to the store 300, and to a user payment account 242, 244, 246, or 248 for the customer on the payment server 200.

Figure 8:
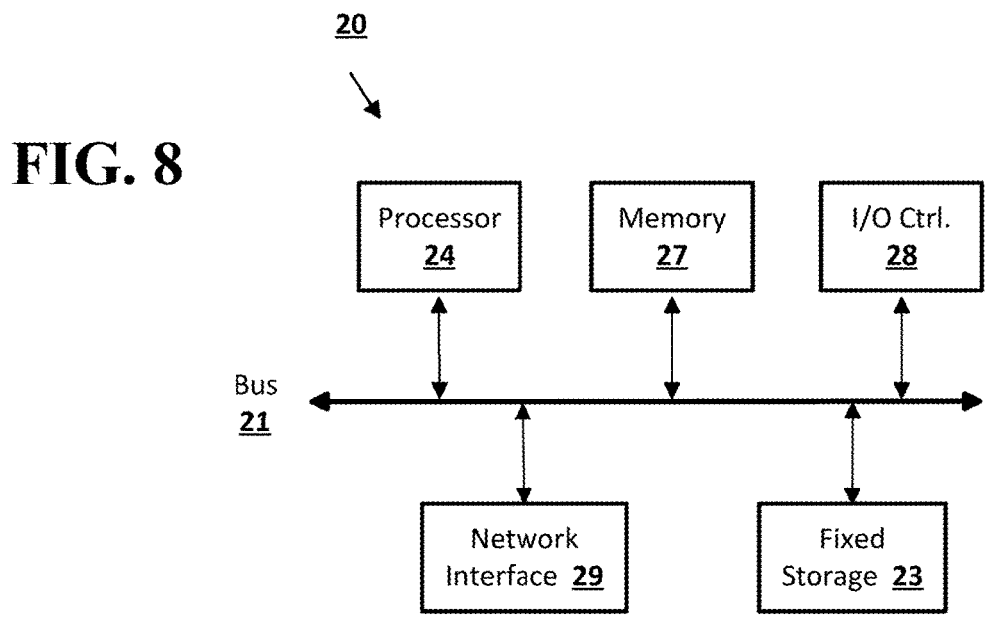
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
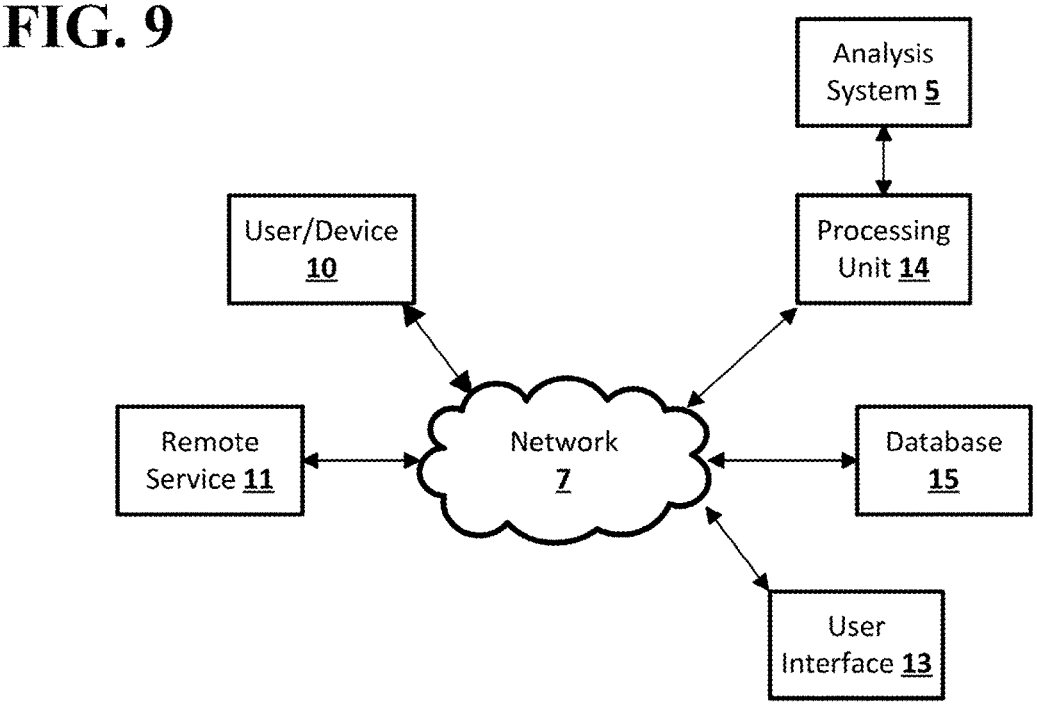
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

In situations in which the implementations of the disclosed subject matter collect personal information about users, or may make use of personal information, the users may be provided with an opportunity to control whether programs or features collect user information (e.g., a user's performance score, a user's work product, a user's provided input, a user's geographic location, and any other similar data associated with a user), or to control whether and/or how to receive instructional course content from the instructional course provider that may be more relevant to the user. In addition, certain data may be treated in one or more ways before it is stored or used, so that personally identifiable information is removed. For example, a user's identity may be treated so that no personally identifiable information can be determined for the user, or a user's geographic location associated with an instructional course may be generalized where location information is obtained (such as to a city, ZIP code, or state level), so that a particular location of a user cannot be determined. Thus, the user may have control over how information is collected about the user and used by an instructional course provider.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method to process transactions, comprising:
    transmitting, by one or more computing device and to an in-store computing device, a notification that a customer is within a store location;
    receiving, by the one or more computing devices and from the in-store computing device, (1) a customer identifier associated with the customer within the store location and a payment account and (2) a point-of-sale identifier associated with a point-of-sale computing device and a point-of-sale card, the point-of-sale card being operable with a plurality of different customers;
    activating, by the one or more computing device, the point-of-sale card associated with the point-of-sale identifier;
    linking, by the one or more computing devices, the customer payment account associated with the customer identifier and the point-of-sale card so a first transaction initiated using the activated and linked point-of-sale card is paid using the linked customer payment account;
    receiving, by the one or more computing devices, a transaction request for a transaction between the customer and the point-of-sale computing device associated with the point-of-sale identifier, the transaction initiated using the activated and linked point-of-sale card at the point-of-sale computing device, wherein the transaction request comprises the point-of-sale identifier and a transaction total;
    determining, by the one or more computing devices, that (1) the point-of-sale card is activated, (2) the customer payment account is linked to the point-of-sale card, and (3) the customer payment account associated with the activated point-of-sale card has sufficient funds for the transaction total; and
    transmitting, by the one or more computing devices, a transaction authorization approving the transaction request.

2. The computer-implemented method of claim 1, further comprising:
    deactivating, by the one or more computing devices, the point-of-sale card after transmitting the transaction authorization; and
    unlinking, by the one or more computing device, the customer payment account with the deactivated point-of-sale card.

3. The computer-implemented method of claim 1, further comprising receiving, by the one or more computing devices, payment of the transaction total from a payment type in the customer payment account.

4. The computer-implemented method of claim 1, wherein determining that the customer payment account associated with the activated point-of-sale card has sufficient funds for the transaction total comprises transmitting, by the one or more computing devices, a payment request for the transaction total to a computing system responsible for the customer payment account.

5. The computer-implemented method of claim 4, wherein payment of the transaction total comprises charging or debiting the customer payment account linked to the point-of-sale card.

6. The computer-implemented method of claim 1, wherein the transaction request is received from a payment computing server associated with the point-of-sale computing device.

7. The computer-implemented method of claim 1, wherein the point-of-sale computing device is a cash register with a magnetic card reader.

8. The computer-implemented method of claim 1, further comprising, receiving, by a customer computing device, a check-in notification that the customer is within the store location, and wherein the notification that the customer is within the store location is displayed on a user interface of the in-store computing device.

9. The computer-implemented method of claim 4, wherein determining that the customer payment account associated with the activated point-of-sale card has sufficient funds for the transaction total further comprises receiving, by the one or more computing devices, an approval notification from the computing system responsible for the customer payment account, the approval notification indicating that the customer payment account can be used to make a payment sufficient to cover the transaction total for the transaction.

10. The computer-implemented method of claim 1, wherein the point-of-sale card is a credit card or debit card comprising one or more of a magnetic strip and a smart chip, or a near-field-communication (NFC) device.

11. The computer-implemented method of claim 2, wherein a second transaction initiated with the deactivated and unlinked point-of-sale card is declined.

12. The computer-implemented method of claim 1, wherein the in-store computing device comprises a tablet, smartphone, laptop, smart watch, or wearable computer.

13. The computer-implemented method of claim 1, wherein a transaction initiated with the point-of-sale card at a second point-of-sale computing device different from the point-of-sale computing device associated with the point-of-sale identifier is declined.

14. A system to process transaction, comprising:
an in-store computing device;
a point-of-sale computing device;
a point-of-sale card; and
one or more computing devices, the one or more computing devices comprising a storage device and a processor communicatively coupled to the storage device, wherein the processor executes application code instructions that are stored in the storage device to cause the one or more computing devices to:
transmit, to the in-store computing device, a notification that a customer is within a store location;
receive, from the in-store computing device, (1) a customer identifier associated with the customer within the store location and a payment account and (2) a point-of-sale identifier associated with the point-of-sale computing device and the point-of-sale card, the point-of-sale card being operable with a plurality of different customers;
activate the point-of-sale card associated with the point-of-sale identifier;
link the customer payment account associated with the customer identifier and the point-of-sale card;
receive a transaction request for a transaction between the customer and the point-of-sale computing device associated with the point-of-sale identifier, the transaction initiated using the activated and linked point-of-sale card at the point-of-sale computing device, wherein the transaction request comprises the point-of-sale identifier and a transaction total;
determine that (1) the point-of-sale card is activated, (2) the customer payment account is linked to the point-of-sale card, and (3) the customer payment account associated with the activated point-of-sale card has sufficient funds for the transaction total; and
transmit a transaction authorization approving the transaction request.

15. The system of claim 14, wherein the processor is further configured to execute application code instructions stored in the storage device to cause the one or more computing devices to:
deactivate the point-of-sale card after transmitting the transaction authorization; and
unlink the customer payment account with the deactivated point-of-sale card.

16. The system of claim 15, wherein a second transaction initiated with the deactivated and unlinked point-of-sale card is declined.

17. The system of claim 14, wherein a transaction initiated with the point-of-sale card at a second point-of-sale computing device is declined, the second point-of-sale computing device different from the point-of-sale computing device associated with the point-of-sale identifier.

18. The system of claim 14, wherein determining that the customer payment account associated with the activated point-of-sale card has sufficient funds for the transaction total comprises transmitting a payment request for the transaction total to a computing system responsible for the customer payment account.

19. The system of claim 14, wherein the transaction request is received from a payment computing server associated with the point-of-sale computing device.

20. The system of claim 14, wherein the processor is further configured to execute application code instructions stored in the storage device to cause the one or more computing devices to receive a check-in notification that the customer is within the store location, and wherein the notification that the customer is within the store location is displayed on a user interface of the in-store computing device.

21. The system of claim 14, further comprising a customer computing device, the customer computing device comprising a second processor configured to execute application code instructions stored in a second storage device to cause the customer computing device to transmit a check-in notification that the customer is within the store location.

22. The system of claim 16, wherein the customer computing device determines that the customer is within the store location by scanning a QR code, communicating with an NFC device, or communicating with a Bluetooth Low Energy beacon.

23. The system of claim 14, wherein the processor is further configured to execute application code instructions stored in the storage device to cause the one or more computing devices to determine that the customer is within the store location.

24. The system of claim 14, wherein the in-store computing device comprises a third processor configured to execute application code instructions stored in a third storage device to cause the in-store computing device to:
receive the notification that the customer is within the store location from the one or more computing devices, wherein the notification comprises an identity of the customer;

display the identity of the customer in a list of identified customers on a user interface of the in-store computing device;

receive a selection of the identity of the customer from the list of identified customers on the user interface of the in-store computing device; and transmit the customer identifier associated with the customer and the point-of-sale identifier associated with the point-of-sale computing device and the point-of-sale card to the one or more computing devices.

25. The computer-implemented method of claim 1, further comprising transmitting, by a customer computing device, notification that the customer is within the store location to the one or more computing devices.

26. The computer-implemented method of claim 24, wherein the customer computing device determines that the customer is within the store location by scanning a QR code, communicating with an NFC device, or communicating with a Bluetooth Low Energy beacon.

27. The computer-implemented method of claim 1, further comprising, determining, by the one or more computing devices, that the customer is within the store location.

28. The computer-implemented method of claim 1, further comprising:

receiving, by the in-store computing device, the notification that the customer is within the store location from the one or more computing devices, wherein the notification comprises an identity of the customer;

displaying, by the in-store computing device, the identity of the customer in a list of identified customers on a user interface of the in-store computing device;

receiving, by the in-store computing device, a selection of the identity of the customer from the list of identified customers on the user interface of the in-store computing device; and transmitting, by the in-store computing device, the customer identifier associated with the customer and the point-of-sale identifier associated with the point-of-sale computing device and the point-of-sale card to the one or more computing devices.

29. A computer program product, comprising:

a non-transitory computer-readable storage device having computer-executable program instructions embodied therein that when executed by a computer cause the computer to process transactions, the computer-readable program instructions comprising:

computer-readable program instructions to transmit, to an in-store computing device, a notification that a customer is within a store location;

computer-readable program instructions to receive, from the in-store computing device, (1) a customer identifier associated with the customer within the store location and a payment account and (2) a point-of-sale identifier associated with a point-of-sale computing device and a point-of-sale card, the point-of-sale card being operable with a plurality of different customers;

computer-readable program instructions to activate the point-of-sale card associated with the point-of-sale identifier;

computer-readable program instructions to link the customer payment account associated with the customer identifier and the point-of-sale card;

computer-readable program instructions to receive a transaction request for a transaction between the customer and the point-of-sale computing device associated with the point-of-sale identifier, the transaction initiated using the activated and linked point-of-sale card at the point-of-sale computing device, wherein the transaction request comprises the point-of-sale identifier and a transaction total;

computer-readable program instructions to determine that (1) the point-of-sale card is activated, (2) the customer payment account is linked to the point-of-sale card, and (3) the customer payment account associated with the activated point-of-sale card has sufficient funds for the transaction total; and computer-readable program instructions to transmit a transaction authorization approving the transaction request.

30. The computer program product of claim 28, further comprising:

computer-readable program instructions to deactivate the point-of-sale card after transmitting the transaction authorization; and computer-readable program instructions to unlink the customer payment account with the deactivated point-of-sale card.

31. The computer program product of claim 29, wherein a second transaction initiated with the deactivated and unlinked point-of-sale card is declined.

32. The computer program product of claim 28, wherein a transaction initiated with the point-of-sale card at a second point-of-sale computing device is declined, the second point-of-sale computing device different from the point-of-sale computing device associated with the point-of-sale identifier.

33. The computer program product of claim 28, further comprising computer-readable program instructions to receive a check-in notification that the customer is within the store location, and wherein the notification that the customer is within the store location is displayed on a user interface of the in-store computing device.

34. The computer program product of claim 28, further comprising computer-readable program instructions to determine that the customer is within the store location.

* * * * *